United States Patent
Lee et al.

(10) Patent No.: US 6,643,643 B1
(45) Date of Patent: Nov. 4, 2003

(54) METHOD OF SEARCHING OR BROWSING MULTIMEDIA DATA AND DATA STRUCTURE

(75) Inventors: Jin Soo Lee, Seoul (KR); Hyeon Jun Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/493,038

(22) Filed: Jan. 28, 2000

(30) Foreign Application Priority Data

Jan. 29, 1999 (KR) .......................................... 1999-2979
Aug. 27, 1999 (KR) ........................................ 1999-35798

(51) Int. Cl.⁷ ............................................. G06F 17/30
(52) U.S. Cl. .................... 707/5; 707/2; 707/9; 707/6
(58) Field of Search .......................... 707/5, 104.1, 6, 707/522, 2, 3; 345/700, 156, 625; 382/219, 170, 141, 305, 217; 385/47; 701/50; 235/94 A; 220/15; 204/232; 131/84.4; 725/46

(56) References Cited

U.S. PATENT DOCUMENTS

| | | | |
|---|---|---|---|
| 5,020,019 A | | 5/1991 | Ogawa ........................... 707/5 |
| 5,297,042 A | | 3/1994 | Morita ........................... 707/5 |
| 5,321,833 A | * | 6/1994 | Chang et al. ...................... 707/5 |
| 5,579,471 A | | 11/1996 | Barber et al. ................. 345/700 |
| 5,724,567 A | * | 3/1998 | Rose et al. ...................... 707/2 |
| 5,793,888 A | | 8/1998 | Delanoy ...................... 382/219 |
| 5,802,361 A | * | 9/1998 | Wang et al. ................. 382/217 |
| 6,081,276 A | | 6/2000 | Delp ........................... 345/589 |
| 6,163,622 A | | 12/2000 | Abdel-Mottaleb et al. .. 382/170 |
| 6,285,995 B1 | | 9/2001 | Abdel-Mottaleb et al. ..... 707/3 |

FOREIGN PATENT DOCUMENTS

| | | |
|---|---|---|
| JP | 06-168277 | 6/1994 |
| JP | 07-021198 | 1/1995 |
| JP | 07-160731 | 6/1995 |
| JP | 07-239856 | 9/1995 |
| JP | 08-249351 | 9/1996 |
| JP | 08-249353 | 9/1996 |
| JP | 09-101970 | 4/1997 |
| JP | 10-154149 | 6/1998 |
| JP | 10-171826 | 6/1998 |
| JP | 10-260983 | 9/1998 |
| JP | 10-289241 | 10/1998 |
| JP | 10-326286 | 12/1998 |
| JP | 11-015834 | 1/1999 |

* cited by examiner

Primary Examiner—Hosain T. Alam
Assistant Examiner—Gwen Liang
(74) Attorney, Agent, or Firm—Fleshner & Kim, LLP (57) ABSTRACT

A method of searching or browsing multimedia data which can effectively search or browse an image is disclosed. In the present method, the searching or browsing is performed in consideration of at least one of a reliability information on a weight of a feature of an input multimedia data and an authority code. According to the method, the system selects reference multimedia data, and searches the multimedia data using a weight of a feature and/or a feature element of the input multimedia data. A user gives feedback on the relevance of the searched or browsed multimedia data, and the system calculates a new weight using the relevance information. Thus, the system updates and maintains new weights of features and/or feature elements.

26 Claims, 4 Drawing Sheets

METHOD OF SEARCHING OR BROWSING MULTIMEDIA DATA AND DATA STRUCTURE

BACKGROUND OF THE INVENTION

1. Field of the Invention

The present invention relates to a method of searching or browsing data, and more particularly to a method of searching or browsing multimedia data such as an image or video.

2. Background of the Related Art

Recently, technology for digital image signal processing has been greatly developed and has been applied in various fields. For example, the digital image signal processing technology may be used in a search system for automatically editing only the face of a specific character in a moving picture file of a movie or drama, in a security system for permitting access to only persons registered in the system, or in a search system for searching a particular data from an image or video detected by a detection system. The performance of such systems basically depend on the accuracy and speed of detecting or searching the desired object. Accordingly, various image searching methods have been proposed in the related art.

An image search system which detects a degree of similarity with an image to be searched utilizing features such as color, texture or shape is disclosed in U.S. Pat. No. 5,579,471 entitled "An image query system and method." Depending upon the image to be searched, the importance of a feature may vary and within one particular feature such as the color, the importance of a feature element such as the red or green color may also vary. However, the above searching system does not take into consideration the different importance of features or feature elements for each image to be searched.

In another searching method entitled "Virage image search engine" (www.virage.com), a user directly inputs the level of importance for features such as the color, texture and shape by assigning weight values. Although an image may be searched according to an importance of a feature using this method, it may be difficult for a user to determine the importance of features.

Therefore, Yong Rui in "Relevance feedback techniques in interactive" SPIE Vol. 3312, discloses a method in which images similar to a reference image are found and the importance of features or weight for features are automatically obtained by calculating the similarities among the found images. However, the weight importance information is not maintained after a search for a specific image is finished and must be calculated for each image search, even for a same image.

In the image search and browsing system or the video (moving image) search and browsing system of the related art, information which describes a particular feature of an image or video data is utilized to perform a more effective search or browsing of the multimedia data. For example, in the image query system, an image may be divided into a plurality of regions and a representative color of each region may be utilized as a feature information of the image, or a whole color histogram of the image may be utilized as a feature information. Thereafter, two images are compared to calculate a similarity based upon the feature information and a determination is made whether the two images are similar.

Also, a user may wish to search and view a section of a video in which a specific character appears or a specific event occurs. At this time, a key frame representing a specific event may be utilized to perform a search and browsing of the video. Moreover, in recent searching and browsing methods, a key frame and a key segment have been defined utilizing an upper level feature information and a lower level feature information. This type of multimedia data search and browsing method may use weight information which indicates a degree of importance or may directly or indirectly use group information which was obtained in advance by grouping similar multimedia data. Such weight information or group information may be predefined in advance by an expert or may be a feature information variably modified by user feedback.

Furthermore, when browsing the multimedia data such as an image or video, the whole or a portion of the original multimedia data can be displayed depending upon a user request or upon a resource condition of the hardware. When portions of the original multimedia data are displayed, weight values are assigned to each portion such that an important portion among the whole data may be preferentially displayed. This weight value may be a varied by a user feedback or defined in advance by an expert.

In U.S. Pat. Nos. 5,020,019 and 5,297,042, information which describes a user preference is utilized to provide a better service for each user. For example, for a movie or video data, the information may include user preference such as action movie, drama or sports. In another example, users may have a different preference and meaning for keywords used most frequently in a keyword search. Therefore, each user can perform a more effective search if weights of keywords used often by a user is assigned differently according to the user preference. Such user preference may be obtained using search conditions and history of previous searches by the user. The information which depends on a user preference may also be varied and updated.

Although the variable feature information may be sufficient for some searching and browsing of multimedia data, when the feature information which includes the weight values is predefined by an expert, the reliability may vary depending upon the trustworthiness of an expert and/or a number of expert opinions used in defining the variable information. In other words, even if the feature information describing a feature of the multimedia data is defined in advance by an expert group, the reliability of the feature information defined for a same image may be inconsistent depending upon the skill of the expert. Similarly, when the feature information is trained by a user feedback, the reliability may vary depending upon the number and accuracy of feedbacks. For example, if two images are incorrectly judged to be similar by a user after a search, such information would be fed back and adversely affect the training of the feature information.

In addition, a user preference input by a new user may be different from the feature information recommended by a server. In such case, the system should assign appropriate weights to the user preference information depending upon the reliability of the user. Finally, as different users gives different feedback to the system, if the reliability of the existing feature information is relatively high, individual feedback of a new user would have a small effect on the update of the feature information. However, if the reliability is low, a feedback of each new user would have a large effect on the feature information value.

Since the searching and browsing methods of the related art do not take into consideration the factors described above, either the reliability of the searched result would be inconsistent or reliable feedback must be input at all times.

SUMMARY OF THE INVENTION

Accordingly, an object of the present invention is to solve at least the problems and disadvantages of the related art.

An object of the present invention is to provide an accurate and effective method of searching or browsing multimedia data.

Another object of the present invention is to provide a method of searching or browsing in consideration of a information reliability and an authority code to perform an update of the feature information.

A further object of the present invention is to provide a data structure for use in searching or browsing multimedia data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the method of searching or browsing multimedia data comprises selecting or inputting a reference multimedia data; searching for the reference multimedia data using weights assigned to features and/or feature elements of the multimedia data; inputting user feedback on the relevance of the searched or browsed multimedia data; measuring a similarity of the reference multimedia data to the resultant images of the search and calculating a new weight using a measured value; and updating previous weights and maintaining the updated weights.

In another aspect of the present invention, a method of searching or browsing multimedia data comprises searching a reference multimedia data using variable information representing importance of features of multimedia data, said variable information being included within the multimedia data structure, and using a reliability information representing a reliability of the variable information; inputting a user feedback on the relevance of the searched or browsed multimedia data; calculating a new variable information using training information fed back by a user or user pattern information stored in the system; and updating the previous variable information using the calculated variable information and/or reliability information, and maintaining the updated information.

In still another aspect of the present invention, a method of searching or browsing multimedia data comprises selecting of inputting a reference multimedia data; searching for the reference multimedia data using variable information representing importance of features of the multimedia data wherein the multimedia data structure includes the variable information, a reliability information of the variable information and an authority code for limiting an authority for a user; inputting a user feedback on a relevance of the searched or browsed multimedia data; measuring a similarity of the reference multimedia data to the resultant images of the search and calculating a new variable information using the measured value; and updating the previous variable information using a selective combination of the reliability information and authority code, and maintaining the updated information.

In still a further aspect of the present invention, a data structure for a multimedia data searching or browsing system comprises a multimedia data; feature information of the multimedia data; and weight information representing a weight of a feature of the multimedia data.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiment of the present invention, examples of which are illustrated in the accompanying drawings.

Figure 1:
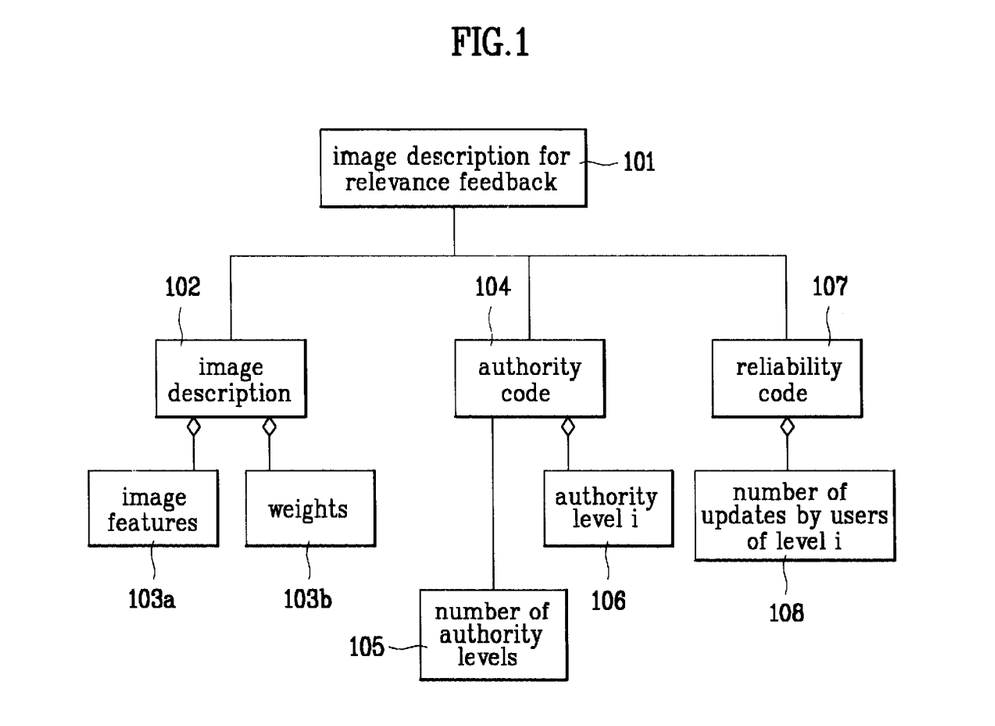
FIG. 1 is a multimedia data structure in a multimedia data searching or browsing system according to the present invention.

FIG. 1 is a multimedia data structure which may be used in a search or browsing system according to the present invention, including an image description for relevance feedback 101. The image description for relevance feedback 101 is information which indicates an importance of features or feature elements (hereinafter generally referred to as "features") trained by user feedback and includes an image description 102, an authority code 104 and a reliability code 107.

Particularly, the image description 102 includes image features 103a for use in the actual search and weights 103b indicating the importance of image features. The reliability code 107 indicates the reliability of the weights. In the preferred embodiment, the reliability code is represented using the number of weight updates by a user of level i 108. The authority code 104 indicates an authority level 106 and the number of the authority levels 105.

The present invention utilizes the authority code 104 to determine whether the weight should be updated and if so, the degree of the update. Moreover, the reliability code 107 and the authority code 104 may be selectively or both included in the data structure depending upon the needs of the system. For example, the data structure may include only the reliability code 107 and the image description 102. In such case, the system may provide the authority code 104. Also, if only one authority level is required in the system, the authority code (104) may be omitted.

The weight 103b of the image description 102 may be updated upon a user feedback and is the weight values assigned to features of the image. Furthermore, an authority level i 106 of the authority code 104 determines whether to update a weight assigned to an image feature and/or the degree of the update. The number of different levels may be determined based upon the needs of the system and is indicated in the number of authority levels 105. For example, assuming there are five levels, a weight may be updated upon feedback by users of the first and second authority levels, and the degree of update for the first level user may be 0.95 while the weight for the second level user may be 0.85.

Figure 2:
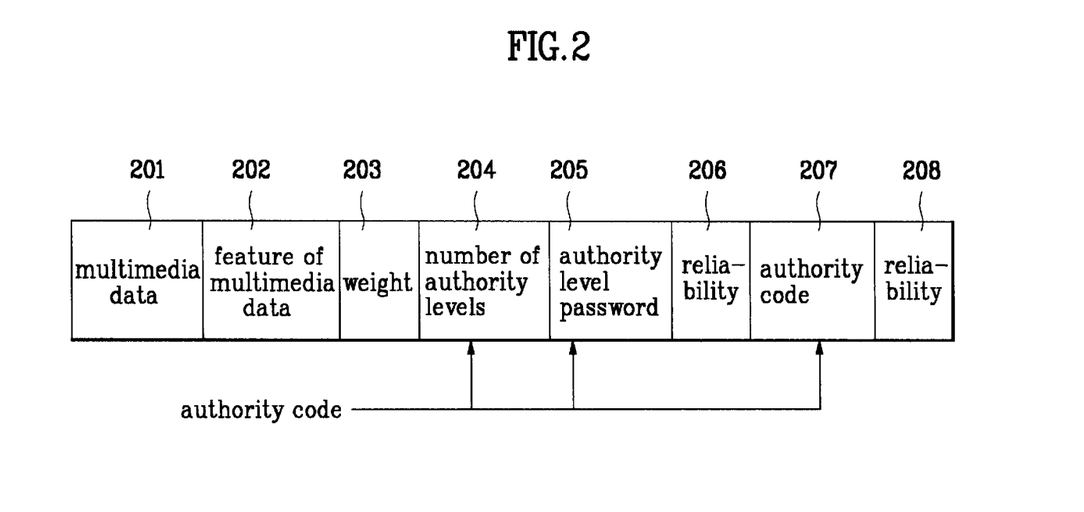
FIG. 2 is a another data structure for use in a multimedia data searching or browsing system according to the present invention.

FIG. 2 is a view illustrating a data structure for use in a multimedia data searching or browsing system according to the present invention. Referring to FIG. 2, the data structure includes a multimedia data 201, a feature information 202 of the multimedia data, a weight information (or variable information) 203 representing the importance of features of the multimedia data, a reliability information 206 and 208 representing the reliability of the weight information, and an authority code representing an authority level for a user.

As described with reference to FIG. 1, the authority levels are used to determine whether to update a weight information and the degree of such update. Thus, in the data structure, the authority code includes the number of authority levels 204 and authority level passwords 205 and 207 for the authority levels. Different passwords may be given to users based upon the authority level to limit or permit appropriate image access, i.e. access to modify the data, based on the authority code. Accordingly, an image access would not be permitted to the users having an authority levels lower than a specified level.

In the preferred embodiment, an image producer (or creator) divides the user authority into n levels and gives appropriate passwords to users based upon the authority level. Thereafter, a user can search or browse images and vary the image description of an image according to a given authority level.

Moreover, because the image description is updated by users of different authority levels, the number of feedbacks by users of each authority level is recorded to calculate the reliability information. Specifically, the number (Nk) of weight updates for an image description by user feedbacks of the kth level is multiplied with a weight coefficient (ak) assigned to the kth level. The product values (ak*Nk) for each respective authority level (1~n) are added and the sum is multiplied by a predetermined reliability coefficient (a) to obtain the reliability of the image description. If two input data have the same multimedia data, but different image description trained by different histories, the user can determine which image to use based upon the reliability information in the respective image description. Here, if there is only one authority level, the image would have a reliability value without the authority information.

Figure 3:
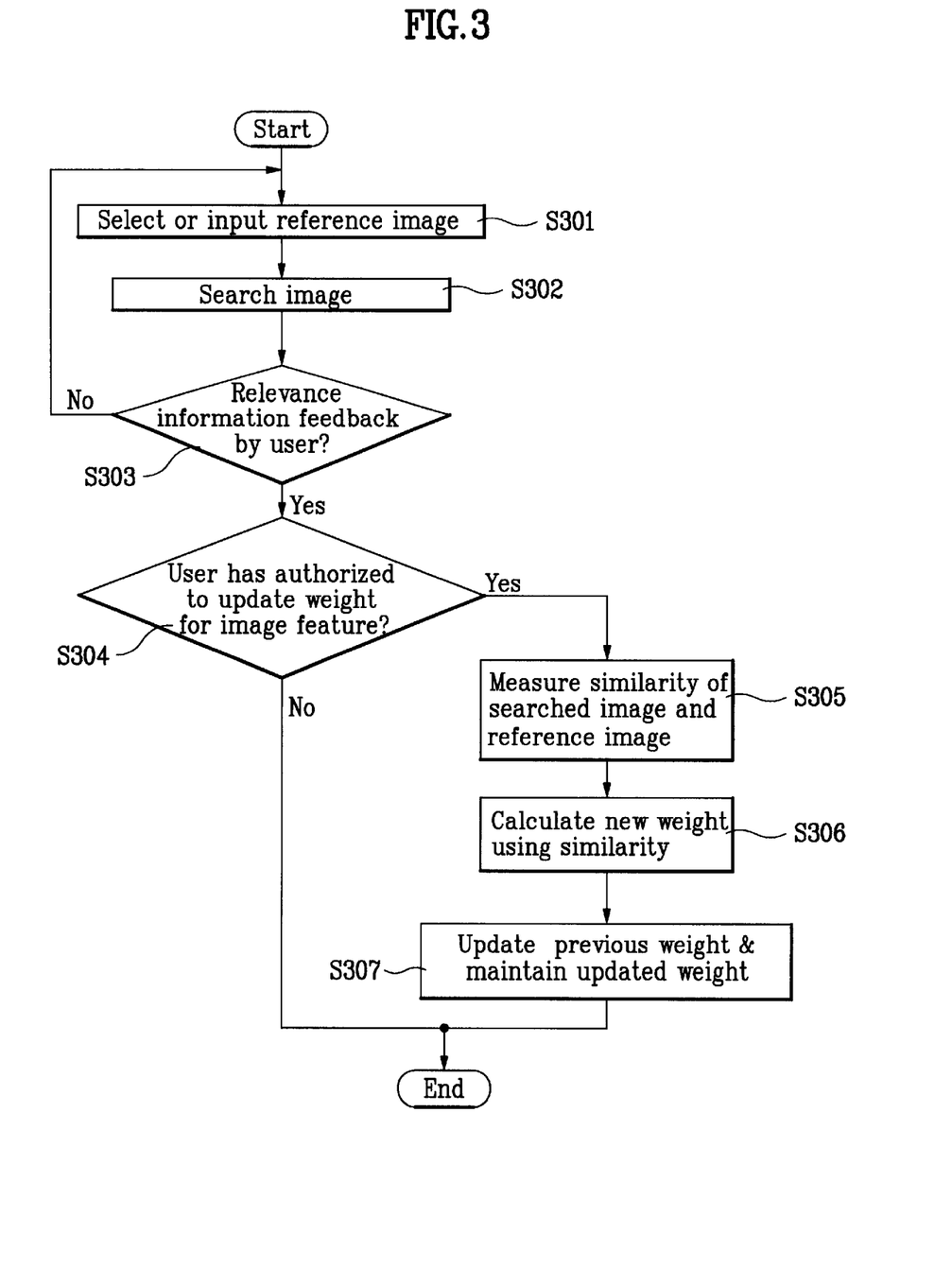
FIG. 3 is a flowchart of a multimedia data searching or browsing process according to a first embodiment of the present invention.

In the first embodiment of the present invention, the multimedia data searching or browsing method is explained when variable information describing features of an image and/or an authority code is included in the input multimedia data. FIG. 3 is a flowchart of a searching or browsing method according to a first embodiment of the present invention. For purposes of explanation, the multimedia data will be assumed to be an image.

Referring to FIG. 3, a reference image is selected or input to the searching or browsing system by a user (step S301). The system then searches for similar images using image features and weights assigned to image features (step S302). The system determines an initial values of the weight if the reference image is selected or input for the first time. The weight values may be assigned for image features such as color, texture or shape and/or may be assigned for image feature elements such as the Ith color element.

Upon viewing the search or browsing result, the user may give feedback by inputting relevance information, i.e. whether the search or browsing result is relevant. Particularly, the user may give positive feedback if the result is good or give negative feedback if the result poor. For example, images determined by a user to be similar to the reference image would be fed back as positive feedbacks and images determined by a user to be different from the reference image would be fed back as negative feedbacks.

Thus, the system judges whether the user has input relevance information (step S303) and if there is no user feedback, the system returns to step S301. However, if there is user feedback, the system determines whether the user has sufficient authority level to update the weight of features (step S304). Here, the system may determine whether the authority level of the user by requiring a user to enter a password. A detailed explanation of the authority levels will be explained below with reference to the third embodiment. Generally, step S304 limits the update of the weight including the degree of the update depending upon the authority level. However, such step may be omitted, in which case, the weight value would be updated for each and every user feedback.

Referring back to FIG. 3, if the authority level of the user allows an update, the system calculates the new weights by measuring the similarity of the reference image and the fed back images (steps S305 and S306) among the searched images. Namely, the system increases the weights of features which would increase the similarity between the reference image and the fed back images if the relevance information is positive information. On the contrary, if the relevance information is negative information, the system increases the weights of features which would increase the dissimilarity between the reference image and the fed back images.

Thereafter, the system updates the previous weight information in the image description using the new weights and maintains the updated weights for the next search or browsing (step S307). Particularly, a weight value is updated by taking into consideration the weight of the kth feature prior to the update, the new weight value of the kth feature obtained in the current image search and an average of new weight values of all features. Here, the degree of effect on the updated weight value due to the previous weight, i.e. weight of the kth feature prior to the update, is inversely proportional to the reliability of the previous weight.

In the preferred embodiment, the weight value can be updated using Equation 1, where Wk(t) is the updated weight of the kth feature, Wk(t−1) is the weight of the kth feature prior to an update, Wnew_k is the calculated weight of the kth feature obtained by a current image search, M(Wnew) is the average of the calculated weights for all features obtained by the current image search, and a is a weight coefficient which determines the degree of update according to the user authority level.

$$Wk(t)=Wk(t-1)+\Delta Wk, (\Delta Wk=a(\text{Wnew}\_k-M(\text{Wnew}))  \quad [1]$$

Alternatively, the weight may be updated using a similar image list or a dissimilar image list obtained during the search process. For example, the system would measure the similarity among the images in the similar list and increase the weight of features contributing to the judgement of the similarity. On the contrary, the system measures the dissimilarity among the images in the dissimilar image list, and increase the weight of features contributing to the judgement of the dissimilarity.

According to the first embodiment of the present invention, the weight information of features used in a search is included within the multimedia data structure input to the system. Thus, the system develops a proper weight by self-training during each searching or browsing of an image. As a result, the system can perform a more effective search or browsing using the weight information of features irrespective of a place or application program, image searching engine. Also, the present embodiment may be adapted and used for searching or browsing an image that the user desires by performing an effective response to subjective and objective queries by the user whenever weights are used for a search or browsing. Accordingly, the first embodiment of the present invention can be suitably adopted to be used as an image format that can use the "relevance feedback" concept for controlling the weight according to the user feedback.

In a second embodiment of the present invention, the reference data selected or input for searching or browsing includes variable information representing the importance of features of the multimedia data and reliability information representing the reliability of the variable information. In the second embodiment, the multimedia data structure which includes the variable information and the reliability information is input to the system, and the system searches for the reference data. For purposes of explanation, the multimedia data will be assumed to be an image.

As in the first embodiment, the user may give feedback on the relevance of the resultant images of the search or browsing. The system then calculates a new variable information using either the relevance information input by the user or the user pattern information stored in the system. For example, the user pattern information may be a history of a user or the history of uses. Thereafter, the system updates the variable information using the new variable information and/or the reliability information, and maintains the updated variable information. Here, the variable information is updated in an analogous manner as the update of weights explained with reference to FIG. 3.

The variable information may be a weight assigned to features used for searching such as the color, texture, or keyword of the multimedia data; a weight assigned to a frame or segment used in searching or browsing a specific video; a weight assigned to user-dependent information representing a user preference or habit, and representing a portion of data used for searching or browsing a main region or main object of the multimedia data; a information for a multimedia grouping of either a similarity list or a cluster model; or a combination of two or more weights as described above.

Generally, the reliability information directly or indirectly represents the reliability of the variable information and is proportional to the amount of user training of the variable information according to the input relevance information. Also, the reliability information can be determined by the performance of the system. A detailed explanation of the reliability information will be explained below with reference to the third embodiment.

Accordingly, if two data has identical multimedia data but different variable information values, the system may select the variable information with the higher reliability or combine the variable information in proportion to the reliability of the variable information when calculating a new variable information. The calculation of the variable information may be used independently irrespective of the second embodiment of the present invention.

For example, assume that an image is created and is copied into a plurality of images by other users, and further assume that the image description of each copied image is developed differently while passing through different application programs. Particularly, the image description developed by different application programs will have different variable information and reliability information of the variable information. If the system then requires a use of the image in a search, a determination as to which copy of the image to use must be made. Because the images with different image description have the reliability information of the variable information, i.e. weight, the system will be able to easily select and use the image having the highest reliability for the search. Also, the system may obtain a new weight by combining the weights of the different image descriptions corresponding to the plurality of image copies in proportion to their reliabilities.

According to the second embodiment of the present invention as described above, since the reliability information of the variable information as well as the variable information is included in the image input to the system, the weights may be updated whenever the image is searched. Thus, the variable information is trained, allowing a more accurate search element. As a result, the system may intellectually develop to an optimal state.

In a third embodiment of the present invention, the multimedia data structure input to the searching or browsing system includes the variable information representing the importance of features, the reliability information representing the reliability of the variable information, and the authority code for limiting an authority for a user. Here, the authority code may be included in the multimedia data or may be provided from the system when justification of the multimedia data search or browsing is fed back.

In the third embodiment of the present invention, the multimedia data search and browsing system selects or inputs a reference multimedia data according to a control signal from the user. Thereafter, the system searches the multimedia data using the variable information, the reliability information of the variable information, and the authority code. The authority code is used to limit an improper training of the variable information by updates in response to all user feedbacks regardless of the reliability of such feedbacks.

For example, an inexperienced user may consider two different images as similar causing the weight assigned to features of the image used in the search to be updated in an improper direction. Thus, the training result of the corresponding image would be lower in reliability. However, in an alternative method, the input image may not include the authority code, instead the system may limit or discriminate the authority of weight updates or the degree of the weight update by providing the authority code. For example, user Log-In IDs may be utilized to determine the authority level.

Moreover, as in the first and second embodiments, the user gives feedback on the relevance of the searched or browsed multimedia data. Thereafter, the system measures the similarity of the reference image to the fed back images among resultant images of the search, and calculates new variable information using the measured value. The system then updates the previous variable information included in the reference image using the calculated variable information, reliability information and/or authority code, and maintains the updated variable information. Thus, if there are two images having different variable information values, the system selects one which has a higher reliability with respect to the variable information value.

Particularly, the new weights may be calculated and updated as in the first embodiment by Equation 1, or by a similarity list or dissimilarity list obtained during the search process. Furthermore, the weight may be updated based upon the reliability of the weight. The weight can be updated by Equation 2 where (Rc) is a built-up reliability of the currently trained image, (Wc) is a weight predetermined for the reliability, (Rt) is the degree of updating the weight corresponding to the currently fed back user authority level, and (Wt) is the weight for the user authority level.

$$\text{Updated weight} = (RcWc + RtWt)/(Rc + Rt) \quad [2]$$

Here, the value of Rc is the number of previous weight updates by a user of respective authority levels.

Figure 4:
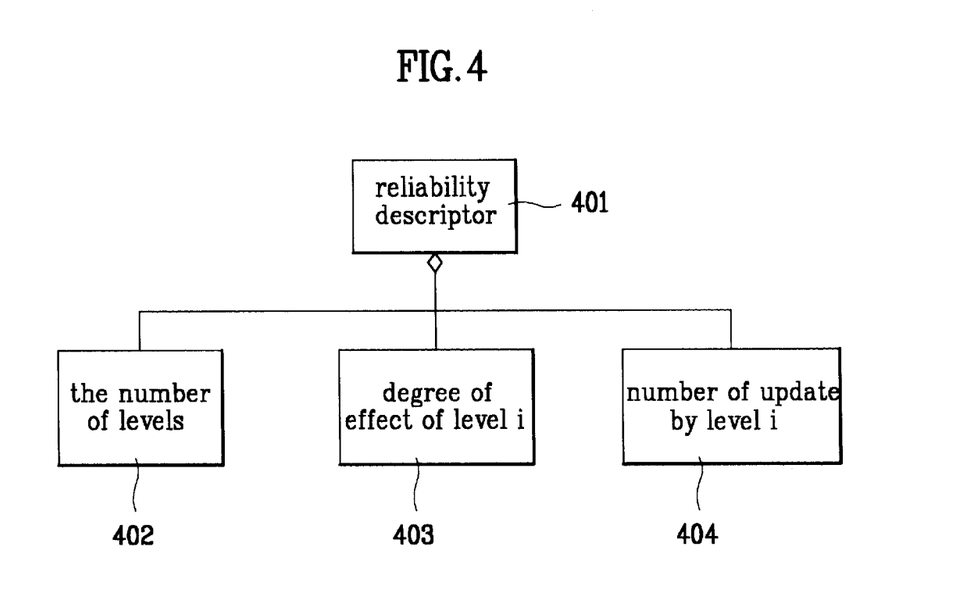
FIG. 4 is a data structure of variable reliability information in a multimedia data searching or browsing system according to a third embodiment of the present invention.
Figure 6:
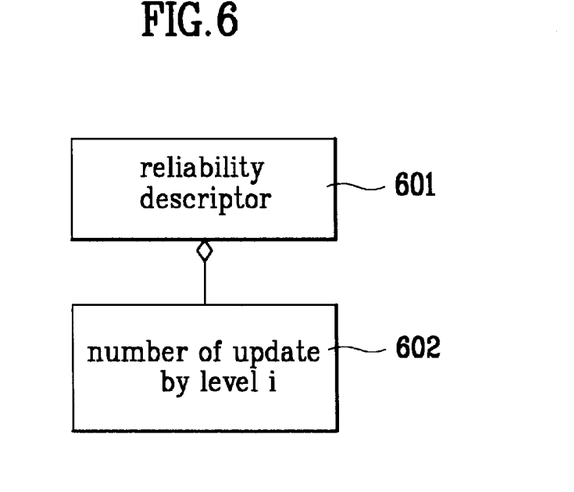
FIG. 6 is a data structure of a fixed reliability information in a multimedia data searching or browsing system according to a third embodiment of the present invention.

FIG. 4 shows a data structure of a variable reliability information in the multimedia data searching or browsing system according to the third embodiment of the present invention. Referring to FIG. 4, the variable reliability descriptor 401 is organized by the number of levels 402, the degree of effect of level I 403, and the number of updates by a user of level I. In contrast, FIG. 6 shows a data structure of a fixed reliability information in the multimedia data searching or browsing system according to the third embodiment of the present invention. Referring to FIG. 6, the fixed reliability descriptor 601 includes the number of updates 602 performed by the user of level I. The reliability information can be obtained as follows.

First, a higher reliability is given to an image with variable information trained frequently by users having high authority level. In other words, the reliability is given in proportion to the number of the users who give feedback and the authority level. Accordingly, the system gives a relatively high reliability to images which has a relatively large amount of training by relevance information fed back by users having high authority level.

Second, the system gives a higher reliability to an image trained mostly by users having authority level in the range from a predetermined level to the upper level. In other words, the system gives a relatively high reliability to images having a relatively large amount of training by relevance information fed back by the user having an authority level over a predetermined level.

Third, the reliability can be determined according to the performance of the system.

Fourth, the system may use the reliability information as shown in FIG. 4 by variably setting and using a number of user levels with corresponding degree of update, or may use a fixed reliability information as shown in FIG. 6. In any case, a relatively higher reliability would be given as the number of updates by user feedbacks and the authority level of the user giving feedback becomes higher.

Figure 5:
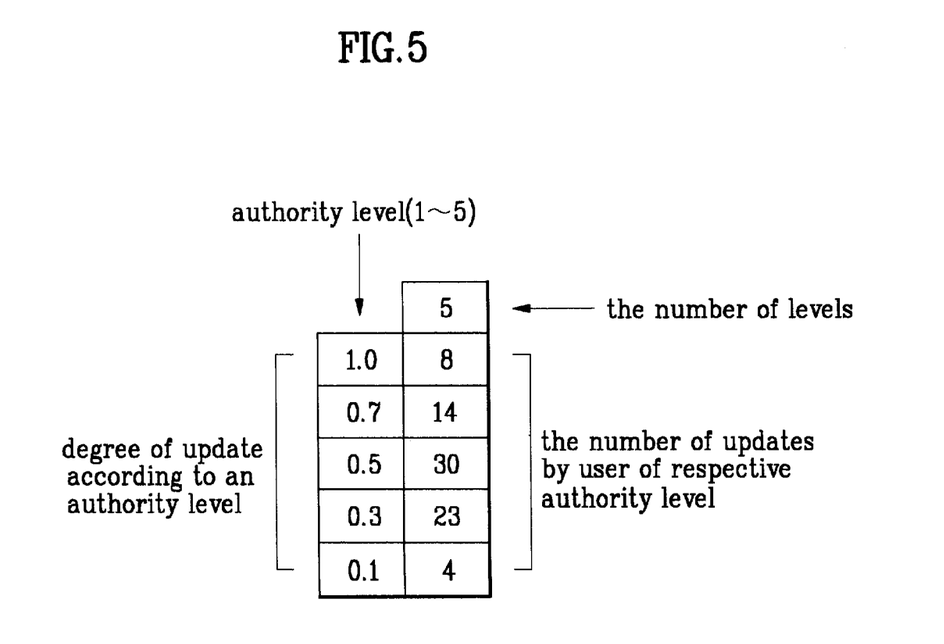
FIG. 5 is an example of a variable weight information in multimedia data according to the data structure of FIG. 4.

FIG. 5 shows an example of a variable reliability information of FIG. 4. In the example, users are classified into five authority levels. The first level has an update degree of 1.0 and has a record of eight updates by users of the first level. The second level has an update degree of 0.7 and has a record of fourteen updates by users of the second level. The third level has an update degree of 0.5 and has a record of thirty updates by users of the third level. The fourth level has an update degree of 0.3 and has a record of twenty-three updates by users of the fourth level. The fifth level has an update degree of 0.1 and has a record of four updates by users of the fifth level. Thus, the number of authority levels and the degree of update influenced by users of the respective authority level are variably determined.

Figure 7:
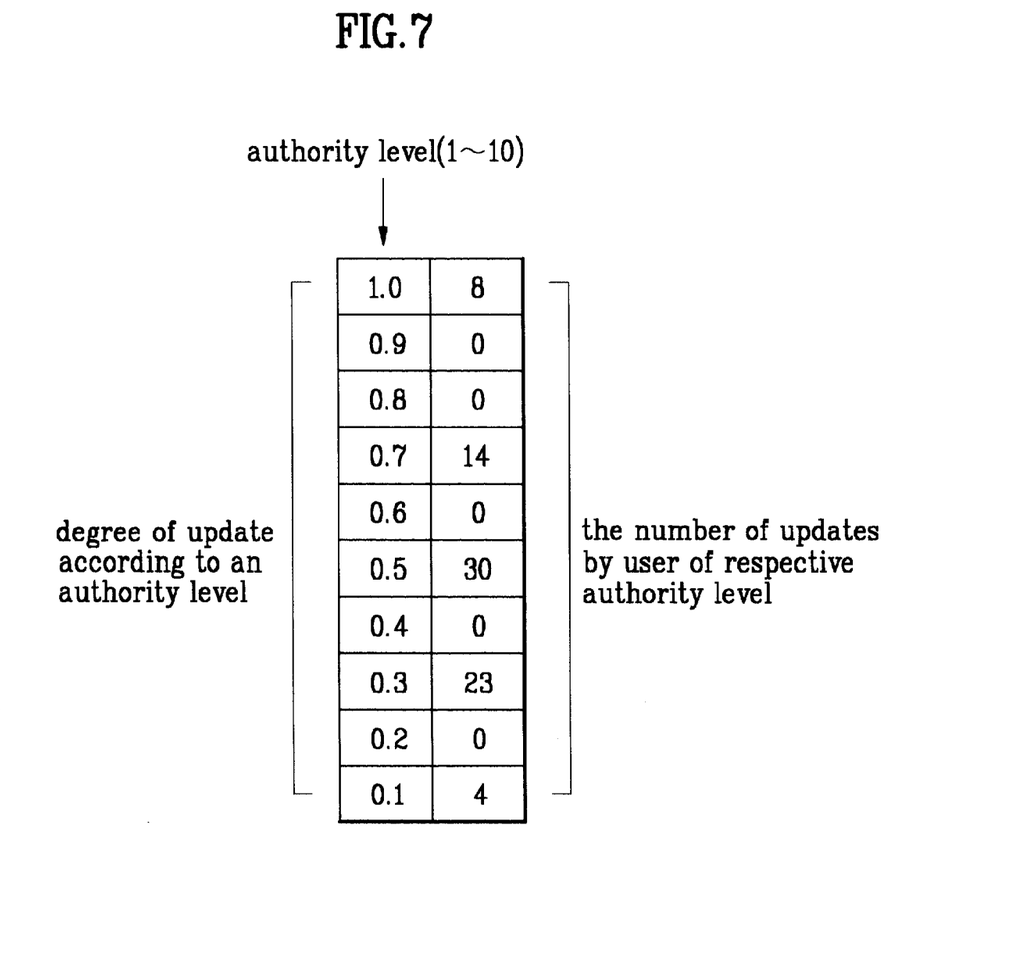
FIG. 7 is an example of the fixed weight information in multimedia data according to the data structure of FIG. 5.

In contrast, FIG. 7 is an example of a fixed reliability information of FIG. 6. Referring to FIG. 7, the number of user authority level is fixed to 10 levels and a corresponding weight-updating degree for each level is allocated in advance from the range of 0.1 to 1. Particularly, the first level has an update degree of 1.0 and has a record of eight updates, the fourth level has an update degree of 0.7 and has a record of fourteen updates, the sixth level has an update degree of 0.5 and has a record of thirty updates, the eighth level has an update degree of 0.3 and has a record of twenty-three updates, and the tenth level has an update degree of 0.1 and has a record of four updates.

The system checks the user authority level as determined above, and effectively controls the access of the image, i.e. permission and/or prohibition of weight update or degree of update. Also, in the system shown in FIG. 7, all or a portion of the 10 levels may be used as necessary. For example, the system may use five levels as in FIG. 5 by not assigning the remaining five levels to users. In such case, the first level of FIG. 7 corresponding to the first level of FIG. 5 would be the first level, the fourth level of FIG. 7 corresponding to the second level of FIG. 5 would be the second level, the sixth level of FIG. 7 corresponding to the third level of FIG. 5 would be the third level, the eight level of FIG. 7 corresponding to the fourth level of FIG. 5 would be the fourth level, and the tenth level of FIG. 7 corresponding to the fifth level of FIG. 5 would be the fifth level. Accordingly, 5 authority levels among 10 fixed authority levels are used and the system can determine whether to permit an update based upon the respective authority levels.

According to the embodiments of the present invention as described above, the following effects can be provided.

First, since the weights (or variable information) of image features are included in the input image and the corresponding image is trained to provide a better search result when the image search is repeated, an effective and accurate search or browsing can be achieved when performing the search with respect to equal images.

Second, when the equal images are updated after being trained in different environments, the reliability information representing the reliability of the weight or variable information of the image is included in the respective image so as to identify which image has been more effectively trained. Thus, the user can search or browse the current image effectively and accurately.

Third, the permission of update and the degree of update are limited according to user authority levels by including an authority code in the input image or by providing the authority code by the system. Accordingly, the corresponding image is prevented from being improperly trained due to thoughtless or abnormal updates by a user.

Fourth, since the reliability information and the authority code is combined with the weight (or variable information) of the image features selectively or together according to the characteristic of the system, the multimedia data search or browsing can be properly performed in a direction where the intelligent training and self-development are effected.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of searching or browsing multimedia data comprising:

(a) receiving a reference multimedia data with a data structure including features of said reference multimedia data and weight information of said features, wherein the data structure of the reference multimedia data further comprises authority information which limits an update of the weight information by a user feedback;

(b) searching for said reference multimedia data using the features and the weight information;

(c) receiving user feedback on a relevance of resultant multimedia data found in (b);

(d) measuring a similarity of the reference multimedia data to the resultant multimedia data and calculating a new weight information of said features using the measured value; and (e) updating the weight information of said features in said data structure of the reference multimedia data using the new weight information.

2. A method of claim 1, wherein the authority information includes a plurality of authority levels, wherein each authority level has degree values affecting the degree of weight information update in (e).

3. A method of claim 2, wherein receiving a password from a user to determine an authority level of the user.

4. A method of searching or browsing multimedia data comprising:

(a) receiving a reference multimedia data with a data structure including features of said reference multimedia data and weight information of said features, wherein the data structure of the reference multimedia data further comprises reliability information indicating a reliability of the weight information, wherein the reliability of the weight information obtained based on authority of user feedback;

(b) searching for said reference multimedia data using the features and the weight information;

(c) receiving user feedback on a relevance of resultant multimedia data found in (b);

(d) measuring a similarity of the reference multimedia data to the resultant multimedia data and calculating a new weight information of said features using the measured value; a measured value and (e) updating the weight information of said features in said data structure of the reference multimedia data using the new weight information.

5. A method of claim 4, wherein a reliability of a weight assigned to a feature is proportional to the amount of training by user feedback.

6. A method of claim 4, wherein the data structure of the reference multimedia data further comprises authority information which limits an update of the weight information by a user feedback.

7. A method of claim 6, wherein the authority information includes a plurality of authority levels, wherein each authority level has degree values affecting the degree of weight information update in (e).

8. A method of claim 7, wherein a higher reliability is given to user feedback by a user with a high authority level.

9. A method of claim 6, wherein in (e), updating the weight information of said features in said data structure of the reference multimedia data depending upon the reliability information and the authority information.

10. The method of claim 4, wherein the reliability information is the number of weight updates made by a user.

11. A method of searching of browsing multimedia data comprising:

searching for a reference multimedia data using variable information representing an importance of a feature of the reference multimedia data;

receiving user feedback on relevance of the searched multimedia data;

calculating a new variable information using user pattern information stored in a system;

updating the variable information using the calculated new variable information and/or reliability information; and maintaining the updated variable information, wherein the user pattern information stored in a system is a number of weight updates made by a user.

12. A method of claim 11, wherein the variable information is one or a combination of:

a weight of features used for searching for the reference multimedia data;

a weight of a frame or segment used for searching or browsing a specific video;

a weight of user-dependent information representing a user preference or user habit and a portion of data used for searching or browsing a main region or main object of the multimedia data; and information for multimedia grouping of a similarity list and a cluster model.

13. A method of claim 11, wherein if at least two identical multimedia data having different variable information for a search or browsing are provided, selecting a multimedia data which has a relatively high reliability with respect to the variable information to calculate the new variable information.

14. A method of claim 11, wherein if at least two identical multimedia data having different variable information for a search or browsing are provided, combining the provided multimedia data in proportion to the reliability of the variable information value to calculate the new variable information.

15. A method of searching or browsing multimedia data comprising:

searching for a reference multimedia data using variable information representing importance of features of the reference multimedia data;

receiving user feedback on relevance of the searched multimedia data;

updating the variable information based on the relevance information, which is used as training information and reliability information; and maintaining the updated variable information, wherein the reliability information includes a number of weight updates made by a user.

16. A method performed by a computing device, comprising;

receiving an image;

extracting characteristic attributes from the image;

ranking the extracted characteristic attributes of the image;

determining reliability of extracted characteristic attributes of the image;

forcing a data structure including at least the extracted characteristic attributes and the reliability information; and searching a database of images using the extracted characteristic attributes, the ranking of the extracted characteristic attributes, and the determined reliability of the extracted characteristic attributes in said data structure, wherein the determined reliability of the extracted characteristic attributes is obtained based on authority of user feedback.

17. The method of claim 16, comprising steps of:

outputting, to a user, images resulting from the searching of the database of images;

inputting information from a user about the images resulting from the searching of the database of images;

ranking characteristic attributes of the image based on the information input from a user about the images resulting from the searching of the database of images; and determining reliability of extracted characteristic attributes of the image based on the information input from a user about the images resulting from the searching of the database of images.

18. The method of claim 16, wherein the method is a computer implemented method for searching or browsing multimedia data.

19. A data record stored in a database, tangibly embodiied on a computer readable medium, for a multimedia data searching or browsing system, comprising;

multimedia data;

variable information representing features of the multimedia data; and reliability information representing a reliability of the variable information, wherein the reliability of the variable information is obtained based on authority of user feedback.

20. A data structure of claim 19, wherein the reliability information includes information on the number of variable information updates by a user.

21. A data structure of claim 19, further comprising an authority code.

22. A data structure of claim 21, wherein the reliability information is variable and includes a number of authority levels, a degree of variable information update for each authority level, and a number of variable information updates by a user of each authority level.

23. A data structure of claim 21, wherein the reliability information is fixed and includes a number of variable information updates by a user of fixed authority levels.

24. A method of searching or browsing a multimedia data having a data structure as in claim 21.

25. A method of searching or browsing a multimedia data having a data structure as in claim 19.

26. The method of claim 19, wherein the reliability information is the number of weight updates made by a user.

* * * * *